United States Patent [19]

Aoki

[11] Patent Number: 5,179,478
[45] Date of Patent: Jan. 12, 1993

[54] ELECTRONIC STILL CAMERA ATTACHMENT FOR A SINGLE-LENS RELEX CAMERA RECORDING AN IMAGE OF THE FOCUSING FOR PLATE THROUGH THE VIEWFINDER

[75] Inventor: Harumi Aoki, Tokyo, Japan

[73] Assignee: Asahi Kogaku Kogyo K.K., Tokyo, Japan

[21] Appl. No.: 438,968

[22] Filed: Nov. 20, 1989

Related U.S. Application Data

[63] Continuation of Ser. No. 947,445, Dec. 29, 1986, abandoned.

[30] Foreign Application Priority Data

Jan. 8, 1986 [JP] Japan .................... 61-654

[51] Int. Cl.⁵ .......................... H04N 5/78
[52] U.S. Cl. .................... 360/35.1; 360/33.1; 358/906
[58] Field of Search .............. 360/33.1, 35.1; 358/310, 312, 335, 906, 909; 354/75, 76, 432, 478, 219

[56] References Cited

U.S. PATENT DOCUMENTS

| | | | |
|---|---|---|---|
| 3,883,883 | 3/1975 | Sano et al. | 354/75 |
| 4,130,834 | 12/1978 | Mender et al. | 358/906 X |
| 4,303,322 | 12/1981 | Someya | 354/432 |
| 4,420,773 | 12/1983 | Toyoda et al. | 358/909 X |
| 4,470,077 | 9/1984 | Komine | 358/335 |
| 4,475,131 | 10/1984 | Nishizawa et al. | 358/906 X |
| 4,494,853 | 1/1985 | Watanabe | 354/478 |
| 4,551,764 | 11/1985 | Ogawa | 358/906 X |
| 4,658,304 | 4/1987 | Tsunekawa et al. | 358/906 X |
| 4,689,696 | 7/1987 | Plummer | 358/333 |
| 4,742,369 | 5/1988 | Ishii et al. | 354/76 X |
| 4,746,990 | 3/1988 | Katoh et al. | 358/906 X |
| 4,769,699 | 9/1988 | Gebauer et al. | 354/75 X |
| 4,814,811 | 3/1989 | Saito et al. | 354/75 X |

FOREIGN PATENT DOCUMENTS

| | | |
|---|---|---|
| 3248419A1 | 7/1983 | Fed. Rep. of Germany . |
| 59-104132 | 7/1984 | Japan .................. 358/906 |

Primary Examiner—Andrew L. Sniezek
Attorney, Agent, or Firm—Sughrue, Mion, Zinn, Macpeak & Seas

[57] ABSTRACT

A combination of photographic film and electronic single-lens reflex camera. An electronic imaging and recording unit is detachably mounted on the single-lens reflex camera in place of the view finder and converts the image light into an electronic signal to be recorded on a magnetic disk. The exposure control for the electronic imaging is partially performed in the main camera body.

8 Claims, 3 Drawing Sheets

ELECTRONIC STILL CAMERA ATTACHMENT FOR A SINGLE-LENS RELEX CAMERA RECORDING AN IMAGE OF THE FOCUSING FOR PLATE THROUGH THE VIEWFINDER

This is a continuation of application Ser. No. 06/947,445 filed Dec. 29, 1986 now abandoned.

FIELD OF THE INVENTION

The present invention relates to an electronic still camera unit capable of electronically taking a still picture by using a single-lens reflex camera which was originally intended for a photographic film.

BACKGROUND OF THE INVENTION

An electronic still camera, which is now well known, uses an electronic photographing element instead of a photographic film. The electric output signal of the element is electronically processed so that image information is magnetically recorded on a recording medium such as a magnetic disk. The photographing element is often made of an image sensor of ½ or ⅔ inch in size. The photographed image area (which is hereinafter referred to as image area) of the element is much less than that of the ordinary photographic film. However, the magnetic disk of the electronic still camera has a size of 54 mm×60 mm which is larger than that of the image sensor. The size of a magnetic disk means for driving the magnetic disk is yet larger than that of the disk. When an optical finder is provided in the camera, it is necessary to make the ratio of enlargement high enough to provide such an angle of view as to enable natural viewing. In that case, the volume of an optical system increases as a general rule. Since it is necessary that the still camera can be naturally operated, it is often made nearly equal in size and form to a conventional single-lens reflex camera which employs 35 mm film. Since the optical system and the magnetic disk system of the electronic still camera are large in size, the whole circuit is also large in size and the cost of the camera is likely to be high. If the cost of the electronic still camera is higher than that of the conventional single-lens reflex camera employing the photographic film, the user of the electronic still camera demands that the electronic still camera has a higher functionality. Although the electronic still camera has advantages that the image photographed by the camera can be immediately confirmed and the magnetic disk can be repeatedly used, the camera has a major disadvantage that the quality of the image is considerably lower than that of an image photographed on the photographic film. For that reason, the electronic still camera has not become as popular as the conventional single-lens reflex camera employing the photographic film.

Since the quality of the image photographed by the electronic still camera which sends out a standard television signal is lower than that of the image photographed on the photographic film, the range of objects to be photographed by the electronic still camera is limited. Therefore, if an image of high quality is to be obtained, the camera employing the photographic film needs to be used for photographing.

Since the size of the image made on the image sensor of the electronic still camera is usually smaller than that of the image made on the photographic film, the electronic still camera needs a special lens for the size of the image made on the image sensor. For that reason, if the electronic still camera is of the lens exchange type, an exchangeable lens different in type from that of the conventional single-lens reflex camera needs to be prepared for the electronic still camera.

Since the conventional camera employing the photographic film has an optical finder, the photographer cannot observe the photographed image if he is at a distance from the camera.

SUMMARY OF THE INVENTION

Accordingly, it is a purpose of the present invention to provide an electronic still camera unit which makes it possible that a single-lens reflex camera employing a photographic film can also be used as an electronic still camera.

It is another purpose of the present invention to provide a camera in which a large number of exchangeable lenses prepared for a conventional single-lens reflex camera employing a photographic film can be used as the lenses of an electronic still camera.

It is still another purpose of the present invention to provide a camera in which the image of an object to be photographed can be recorded on a photographic film while the image is being observed on a television monitor.

The electronic still camera unit of the present invention comprises an electronic photographing element which receives a flux of light which is originally intended for a view finder, and a magnetic disk recorder which records an image signal sent from the photographing element. The electronic still camera unit is removably attached to the finder section of a single-lens reflex camera.

DETAILED DESCRIPTION OF THE PREFERRED EMBODIMENTS

According to the present invention, the light transmitted to the view finder of the single-lens reflex camera employing a photographic film is received by the electronic photographing element so that the light is converted into an electronic signal. An optical system corresponding to the view finder and an electronic signal converter are removably attached to the camera at the observing window of the finder or removably attached to the camera in the same manner as a conventional exchangeable finder. As a result, photographing can be simultaneously performed both on the photographic film and in the electronic still camera unit or can be optionally performed either on the film or in the electronic camera unit.

An embodiment of the present invention is hereafter described with reference to the drawings.

Figure 1:
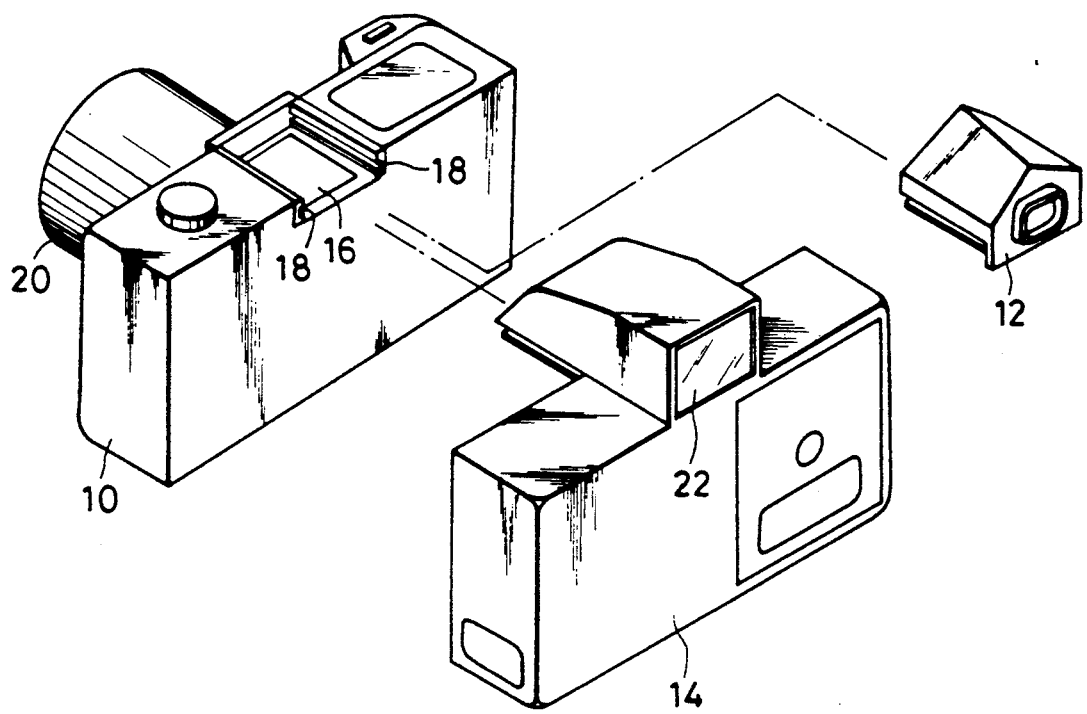
FIG. 1 shows a view for explaining how to use a single-lens reflex camera according to the present invention.

FIG. 1 shows an exterior view of a single-lens reflex camera to which the embodiment is applied. Either one of an exchangeable finder 12 and an electronic still camera unit 14 is optionally attached to the back of the body 10 of the camera. In other words, when the camera is to be used to make a photographed image on a photographic film, the finder 12 is inserted forward into the horizontal guide groove 18 at the top of a focusing plate 16 on the camera body 10 so that the finder 12 is attached thereto. When the electronic still camera unit 14 is attached to the camera body 10 instead of the finder 12 so as to be used for photographing, a flux of light which would be transmitted to the finder is transmitted to an image sensor whose electric output is processed by the circuit of the electronic still camera unit. The figures show a photographic lens 2 and a liquid crystal display means 22 which functions as a finder for the electronic still camera unit 14.

Figure 2:
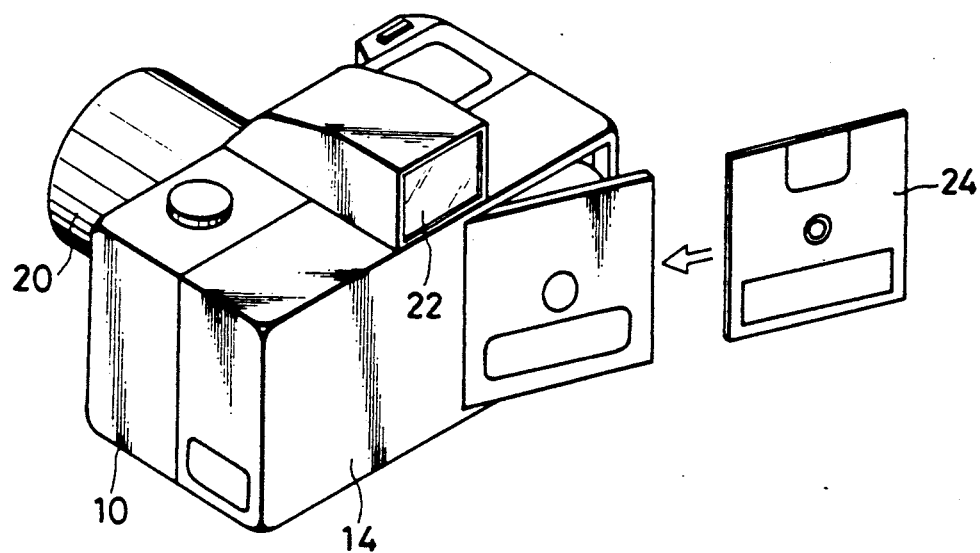
FIG. 2 shows an exterior view of the single-lens reflex camera and an electronic still camera unit provided in accordance with the present invention and attached to the camera.

FIG. 2 shows the electronic still camera unit 14 attached to the camera body 10 and having a back lid opened to insert a magnetic disk 24 for image recording.

Figure 3:
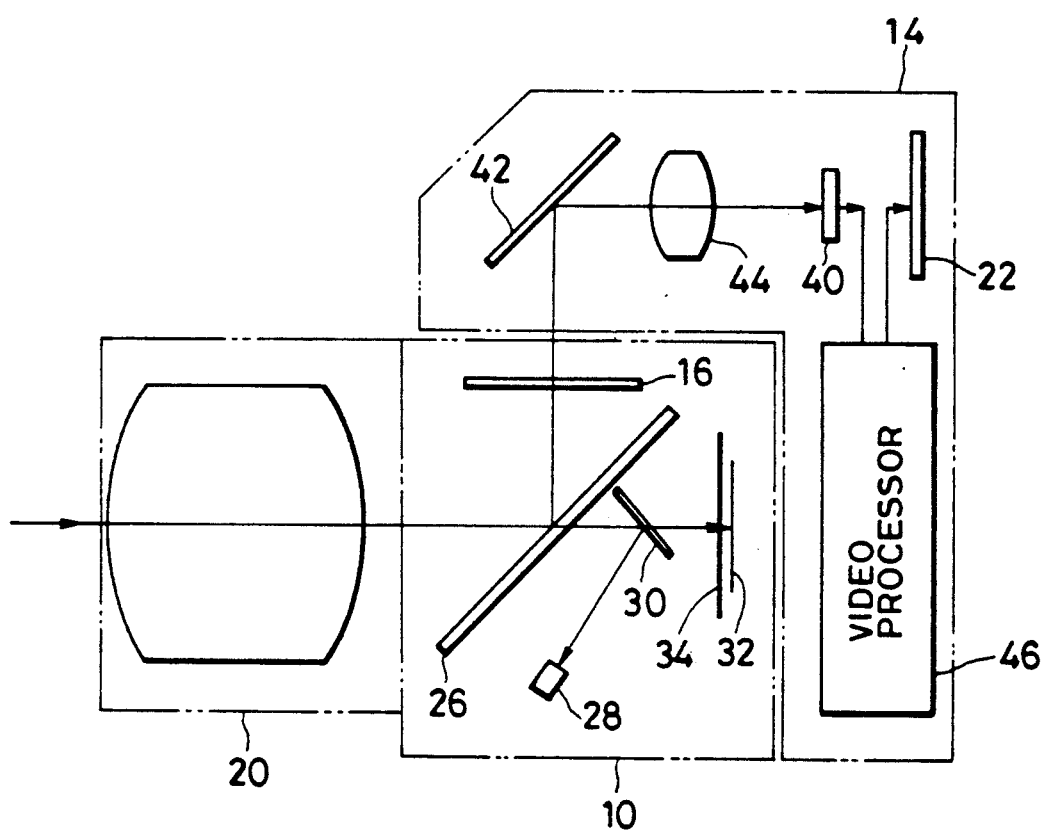
FIG. 3 shows a sectional view of the assembly of the single-lens reflex camera and the electronic still camera unit along the central vertical plane thereof.

FIG. 3 shows a sectional view of the camera body 10 and the electronic camera unit 14 along their central vertical plane. Provided in the camera body 10 are a quick return mirror 26, a photo sensor 28 for measuring the exposure, a small mirror 30 for directing rays of light from the photographing lens 20 to the photo sensor 28, a photographic film 32 and a shutter 34. These components in the camera body 10 are the same as those of a conventional single-lens reflex camera and therefore are not described in detail.

In the electronic still camera unit 14, an image sensor 40 is provided. An image on the focusing plate 16 is recreated on the image sensor 40 by a mirror 42 and a lens 44. The mirror 42 is provided so that the image created on the image sensor 40 is compatible with the direction of scanning of the image sensor of a conventional video camera. If the direction of scanning of the image sensor 40 is opposite to that of the image sensor of the conventional video camera, the mirror 42 does not need to be provided. Also provided in the camera unit 14 is a video signal processing circuit 46 which processes an electric video signal from the image sensor 40 to perform visual indication on the liquid crystal display means 22 and which controls the magnetic disk 24 to perform recording thereon.

FIGS. 1, 2 and 3 show how the electronic still camera unit 14 is attached to the camera body 10 after the finder 12 is detached therefrom. However, the optical system of the finder 12 may be used instead of the mirror 42 and the lens 44 so that the rays of light coming out of the observation window of the finder are transmitted to the image sensor 40 of the electronic still camera unit 14 directly or through a lens. In such a modification of the embodiment, the electronic still camera unit is formed as a flat plate so as to be unlikely to suffer external damage, and an auxiliary means for accurately positioning the camera unit on the camera body 10 and securing the unit thereon needs to be provided. On the other hand, in the embodiment shown in FIGS. 1, 2 and 3, it is very easy to position and secure the electronic still camera unit 14 on the camera body 10, and the auxiliary means is not needed if the strength of the projecting portion of the unit 14, which is fitted in the guide groove of the camera body 10, is higher than a certain level.

Figure 4:
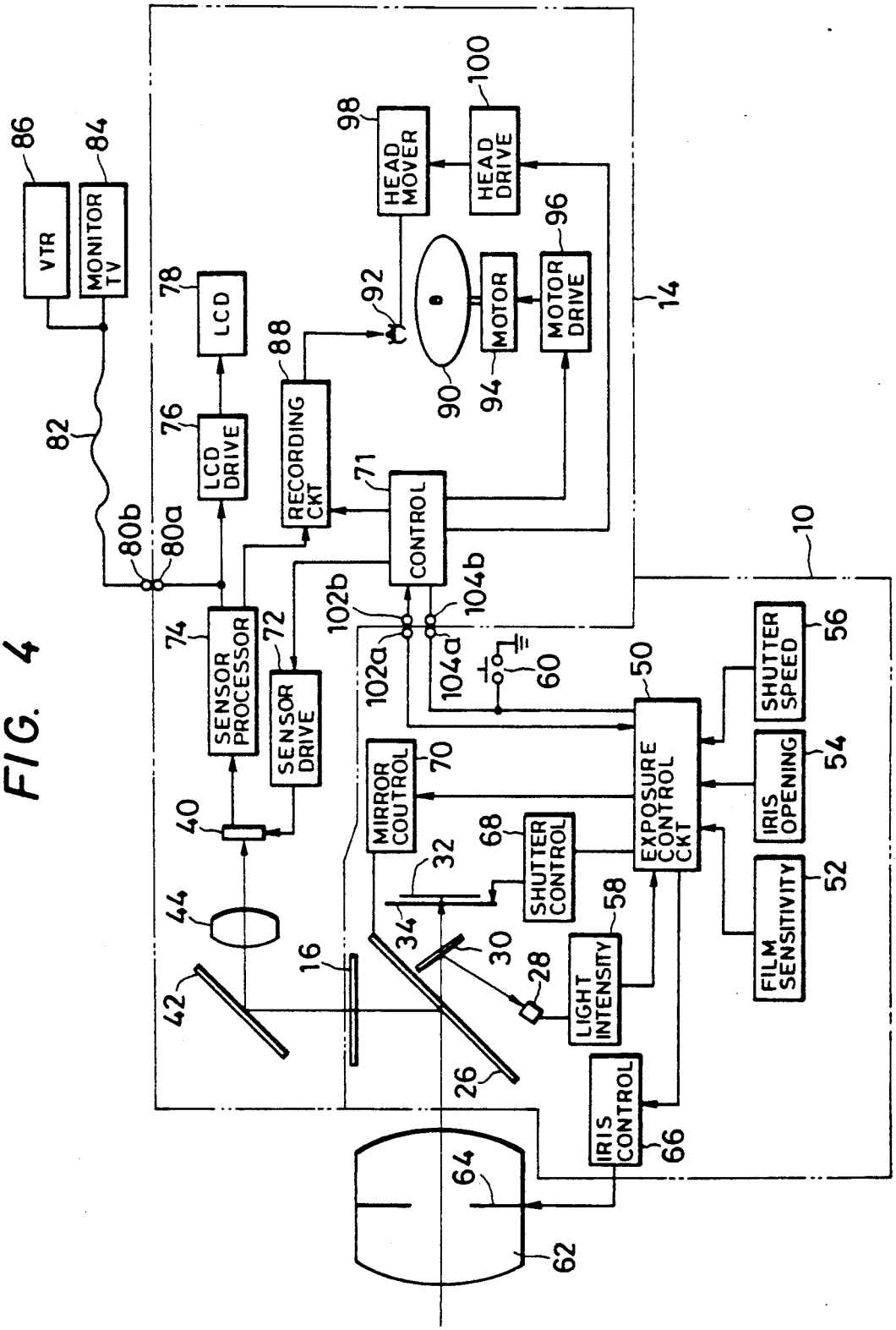
FIG. 4 shows a block diagram of an example of the electric circuitry of the single-lens reflex camera and the electronic still camera unit.

FIG. 4 shows a block diagram of the electric circuitry of the single-lens reflex camera to which the embodiment of the present invention is applied. Provided in the camera body 10 is an exposure control circuit 50 which receives film sensitivity information 52, set aperture of diaphragm information 54, set shutter speed information 56, a photographed object light quantity signal from a light measuring circuit 58 and an operation signal form a release button 60 so as to regulate the quick return mirror 26, the shutter 34 and an iris 64 for a photographic lens 62. The control of the exposure through the exposure control circuit 50 may be of the iris priority type, the shutter priority type or the program type which are well known for conventional single-lens reflex cameras. Light reflected from the surface of the photographic film may be received by the photo sensor 28 to measure the quantity of the light. An iris controller 66 receives a control signal from the exposure control circuit 50 to reduce the opening of the iris 64 to a predetermined diameter. A shutter controller 68 receives a shutter control signal from the exposure control circuit 50 to open the shutter 34 for an appointed time. A mirror control mechanism 70 receives an exposure start signal from the exposure control circuit 50 to turn the quick return mirror 26 upwards. The circuits provided in the camera body 10 are the same as those of a conventional single-lens reflex camera employing a photographic film.

In the electronic still camera unit 14, a controller 71 for regulating circuit components in the unit 14 is provided. The controller 71 regulates a drive circuit 72 for the image sensor 40. The video signal from the image sensor 40 is converted, by a signal processing circuit 74, into a signal whose form is appropriate for liquid crystal display. An output signal from the signal processing circuit 74 is applied to a liquid crystal display drive circuit 76 which functions to reproduce the image of the object on a liquid crystal display means 78 on the basis of the output signal. The output signal is also applied to an external terminal 80a. The terminal 80b of a signal cable 82 is connected to the external terminal 80a to reproduce the image of the object on a monitoring television set 84 or record the image on a video tape recorder 86.

An image signal is sent from the signal processing circuit 74 to a recording head 92 for a magnetic disk 90 through a recording circuit 88 so that the image signal is magnetically recorded on the disk 90. The magnetic disk 90 is rotated by a motor 94 driven by a motor drive circuit 96. The magnetic head 92 is moved to a radial position for a desired track on the magnetic disk 90 by a head moving mechanism 98. A head drive circuit 100 instructs the head moving mechanism 98 of the radial position for the desired track in accordance with a command from the controller 71.

The controller 71 receives exposure information from the exposure control circuit 50 in the camera body 10 through terminals 102a and 102b and receives a release signal for the release button 60 through terminals 104a and 104b. The terminals 102a and 104a are located on the side of the camera body 10, while the terminals 102b and 104b are located on the side of the electronic still camera unit 14. It is preferable that the terminals 102a, 102b, 104a and 104b are simultaneously connected to each other by attaching the unit 14 to the camera body 10. For example, the terminals are provided at the guide groove 18.

The operation of the single-lens reflex camera is hereafter described with reference to the circuitry shown in FIG. 4. The light transmitted through the lens 62 is reflected by the quick return mirror 26 so that the image of the object is made on the focusing plate 16. A part of the light is transmitted through the quick return mirror 26 and then reflected by the second mirror 30 so that the reflected light reaches the light reception element 28 which measures the light intensity. The output signal of the photo sensor 28 is entered into the light measuring circuit 58 which converts the signal into an appropriate signal which is entered into the exposure control circuit 50. The exposure control circuit 50 calculates a proper exposure value in terms of the measured light value information from the light measuring circuit 58, the film sensitivity information 52, the aperture of diaphragm information 54 and the shutter speed information 56.

When the release button 60 is pressed, a signal is sent to the mirror control mechanism 70 to put the quick return mirror 26 and the small mirror 30 out of the photographic optical path. After that, a signal based on the calculated proper exposure value is sent to the iris controller 66 and the shutter controller 68 to drive the iris 64 and the shutter 34.

The above-described operation is the same as that of a conventional single-lens reflex camera. The measurement of the light may be performed by using the light reflected from the surface of the film. The control of the exposure may be of either the iris priority type or the shutter priority type.

When the electronic still camera unit 14 is attached instead to the finder 12, the image on the focusing plate 16 is reimaged on the image sensor 40 by the mirror 42 and the lens 44. A switch (not shown in the drawings) for changing between the electronic still camera unit and the photographic film is then put in a position for the electronic still camera unit so that an electronic still camera unit mode is set. As a result, the shutter controller 68 is put out of action, and an exposure signal with the proper exposure value calculated by the exposure control circuit 50 is applied to the controller 71 through the terminals 102a and 102b. The controller 71 generates another exposure signal which corresponds to the exposure signal from the exposure control circuit 50 and is used to control the drive of the image sensor 40. The latter exposure signal is sent to the image sensor drive circuit 72 which sends an image sensor drive signal to the image sensor 40 to drive it for a prescribed time based on the proper exposure value. The image output of the image sensor 40 is converted into an appropriate signal by the signal processing circuit 74. The appropriate signal is sent to the liquid crystal display drive circuit 76 to drive the liquid crystal display 78 by which the image on the image sensor 40 can be monitored. The appropriate signal can be taken out from the external terminal 80a to record the signal on the video tape recorder 86 or observe the image on the monitoring television set 84. The video tape recorder 86 and the monitoring television set 84 are provided at a distance from the camera body 10.

In the above-described operation, the size of the opening of the iris is fixed and the charge storage time of the image sensor 40 is changed. However, the charge storage time may be fixed at 1/60 second, 1/30 second or the like as in a conventional video camera and the size of the opening of the iris 64 may be continuously changed depending on the proper exposure value.

When the release button 60 is pressed, the release signal is sent to the controller 71 through the terminals 104a and 104b so that a signal indicating a shutter speed based on the proper exposure value is applied to the image sensor drive circuit 72 to control the charge storage time of the image sensor 40. The output of the image sensor 40 at that time is a still picture signal which is processed by the signal processing circuit 74 and then sent to the recording circuit 88 which converts the signal into an appropriate recording signal for controlling the recording current of the magnetic head 92. In response to the release signal, the motor drive circuit 96 drives the motor 94 to rotate the magnetic disk 90. The magnetic head drive circuit 100 operates the magnetic head moving mechanism 98 to put the magnetic head 92 in the position for the desired track on the magnetic disk 90. A still picture is then magnetically recorded on the magnetic disk 90 mounted on the shaft of the motor 94.

Although the exposure control circuit 50 provided in the camera body 10 is used to determine the exposure of the image sensor 40 in the construction shown in FIG. 4, the output of the image sensor 40 itself may be used to determine the exposure thereof by an exposure control circuit (not shown in the drawings) provided in the electronic still camera unit 14.

Whether electronic still photographing and/or photographic film photographing and/or magnetic disk recording are performed or not can be determined by optionally operating the changing switch and other mode selection switches so that the circuits and mechanisms in the camera body 10 and the circuits (especially, the controller 71) in the electronic still camera unit 14 are put in or out of action.

According to the present invention, a single-lens reflex camera originally intended for photographic film can be used for electronic still photography, through the simple operation of removing the view finder of the camera and attaching an electronic still camera unit to the rear of the camera. A new camera, which is easy to handle and feels little strange as to the size of the camera, can thus be provided.

It is not necessary to prepare a new lens for the new camera. The lenses of the single-lens reflex camera can be directly used for the new camera.

A photographed image on a photographic film or on a magnetic disk can be monitored on a television set or recorded on a video tape recorder at a distance from the camera by using the external terminal of the electronic still camera unit.

What is claimed is:

1. An electronic still camera, comprising:
a single-lens reflex camera having an optical unit for receiving image light and focusing said image light on a photographic film contained in said camera, said single-lens reflex camera further including a focusing plate for receiving light from said optical unit for forming an image thereon, and a viewfinder port for providing image light from said focusing plate to a viewfinder; and
an auxiliary unit detachably mounted on a body of said reflex camera, said auxiliary unit receiving said image light from said view finder port and including an electronic image sensor for converting said image light into an image signal and a magnetic disk recorder for recording said image signal on a magnetic disk,
wherein said auxiliary unit includes means for recreating said image from said focusing plate onto said electronic image sensor.

2. An electronic still camera as recited in claim 1, wherein said means for recreating consists of a single reflector and a single lens.

3. An electronic still camera as recited in claim 1, further comprising display means for monitoring said image light received by said electronic image sensor.

4. An electronic still camera as recited in claim 1, further comprising:
- a release button on said reflex camera body, a release signal being provided by an operation of said button;
- an exposure control circuit included in said reflex camera body providing an exposure control signal;
- a plurality of first contacts on said reflex camera body connected to electronic circuitry in said single-lens reflex-camera and carrying said release signal and said exposure control signal;
- a sensor control circuit in said auxiliary unit for controlling an exposure of said electronic image sensor based on said exposure control signal and said release signal and for controlling said recording of said image signal on said magnetic disk; and
- a plurality of second contacts on said auxiliary unit connectable with said first contacts and providing said release signal and said exposure control signal to said sensor control circuit.

5. An electronic still camera as recited in claim 4, wherein said exposure control circuit includes within said reflex camera body a photo sensor upon which said exposure control signal is based.

6. An electronic still camera as recited in claim 1, wherein said auxiliary unit includes an external terminal carrying said image signal.

7. An electronic still camera as recited in claim 1, wherein said viewfinder is detachably mounted on said body of said reflex camera.

8. An electronic still camera, comprising:
- a single-lens reflex camera having an optical unit for receiving image light and focusing said image light on a photographic film contained in said camera, said single-lens reflex camera further including a focusing plate for receiving light from said optical unit for forming an image thereon, and a view finder port through which said light received by said focusing plate is transmitted; and
- an auxiliary unit detachably mounted on a body of said reflex camera, said auxiliary unit receiving said image light from said view finder port and including an electronic image sensor for converting said image light into an image signal and a magnetic disk recorder for recording said image signal on a magnetic disk.

* * * * *